United States Patent
Blinick et al.

(10) Patent No.: US 7,787,482 B2
(45) Date of Patent: Aug. 31, 2010

(54) INDEPENDENT DRIVE ENCLOSURE BLADES IN A BLADE SERVER SYSTEM WITH LOW COST HIGH SPEED SWITCH MODULES

(75) Inventors: Katherine Tyldesley Blinick, Tucson, AZ (US); Rezaul Shah Mohammad Islam, Tucson, AZ (US); Gregg Steven Lucas, Tucson, AZ (US); Robert Earl Medlin, Tucson, AZ (US); Tohru Sumiyoshi, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 735 days.

(21) Appl. No.: 11/550,079

(22) Filed: Oct. 17, 2006

(65) Prior Publication Data

US 2008/0091810 A1   Apr. 17, 2008

(51) Int. Cl.
 *H04L 12/28* (2006.01)
(52) U.S. Cl. .................................... 370/420; 709/223
(58) Field of Classification Search ................ 709/222, 709/223; 361/825, 685, 680, 686; 370/420
See application file for complete search history.

(56) References Cited

U.S. PATENT DOCUMENTS

| 6,934,864 | B2 | 8/2005 | Chu et al. |
| 7,012,815 | B2 * | 3/2006 | Garnett et al. ............. 361/825 |
| 2004/0013092 | A1 | 1/2004 | Betker et al. |
| 2005/0198523 | A1 | 9/2005 | Shanbhag et al. |
| 2005/0262090 | A1 | 11/2005 | Correl et al. |
| 2006/0034276 | A1 | 2/2006 | Saklecha et al. |
| 2006/0034284 | A1 | 2/2006 | Saklecha et al. |
| 2006/0034309 | A1 | 2/2006 | Saklecha et al. |
| 2006/0053215 | A1 | 3/2006 | Sharma |
| 2006/0218388 | A1 * | 9/2006 | Zur et al. ...................... 713/2 |
| 2007/0005833 | A1 * | 1/2007 | Seto ........................... 710/52 |
| 2008/0040462 | A1 * | 2/2008 | Islam et al. ................. 709/222 |

OTHER PUBLICATIONS

Jo Maitland, "User endures integration bump with Brocade blade switch", SearchStorage.com, published May 11, 2004, http://searchstorage.techtarget.com/originalContent/0,289142,sid5_gci963380,00.html, 3 pages.
Robert McMillan, "Storage blade coming to IBM's BladeCenter", InfoWorld, published Mar. 25, 2005, http://www.infoworld.com/article/05/03/25/HNibmstorageblade_1.html, 4 pages.

* cited by examiner

*Primary Examiner*—Dang T Ton
*Assistant Examiner*—Wei Zhao
(74) *Attorney, Agent, or Firm*—Stephen R. Tkacs; Stephen J. Walder, Jr.; Randall J. Bluestone (57) ABSTRACT

A high speed fabric is provided and is partitioned into sub-fabrics for host adapter traffic and device adapter traffic. A high-speed switch includes an expander for host adapter traffic and an expander for device adapter traffic. The high-speed switch also includes a plurality of connectors, where each connector is partitioned into dual interfaces. For each connector, one interface is connected to the host adapter traffic expander and the other interface is connected to the device adapter traffic expander. Blades are provided with one or more connectors, where each connector is partitioned into dual interfaces for host adapter traffic and device adapter traffic. The blades may be any combination of processor blades, boot drive enclosure blades, switched bunch of disks enclosure blades, and/or integrated RAID controller disk enclosure blades.

6 Claims, 8 Drawing Sheets

INDEPENDENT DRIVE ENCLOSURE BLADES IN A BLADE SERVER SYSTEM WITH LOW COST HIGH SPEED SWITCH MODULES

BACKGROUND

1. Technical Field

The present application relates generally to an improved data processing system and method. More specifically, the present application is directed to method and apparatus to provide independent drive enclosure blades in a blade server system with low cost, high speed switch modules.

2. Description of Related Art

In some systems, a collection of servers is interconnected into a server system, sharing high-speed fabric topologies, such as in BladeCenter® systems. "BladeCenter" is a trademark of International Business Machines Corporation in the United States, other countries, or both. A BladeCenter® system is a server architecture that houses multiple server modules ("blades") in a single chassis. Blade servers are widely used in data centers to save space and improve system management. Either self-standing or rack mounted, the chassis provides the power supply. Each blade may have its own CPU, memory, and hard disk. Blade servers generally provide their own management systems and may include a network or storage switch.

Most computer systems require storage and a means of accessing the storage. Storage may be accessed by means of redundant array of independent disks (RAID) controllers, either singular or redundant. For example, in some current BladeCenter® configurations, myriad server blades are populated and interconnected to a shared fabric. Appropriate switch modules are also populated and interface the fabric to RAID controllers within the BladeCenter® system. The RAID controllers in turn provide connectivity to the fundamental storage, such as hard disk drives.

BladeCenter® systems are transitioning from external storage to internal storage, whereby customers can achieve a "store-in-a-box" solution. Such products constitute server blades, RAID controller blades, storage blades, and switch modules to interconnect them all. An example of a storage blade is a drive enclosure blade (DEB). DEBs may provide boot drives (B-DEB) for the processor blades, a "switched bunch of disks" (SBOD) with no redundant array of independent disks (RAID) controller (S-DEB), or a SBOD with an integrated RAID controller (I-DEB).

SUMMARY

In another illustrative embodiment, a blade server system comprises a plurality of blade slots and at least one switch module. Each of the at least one switch module comprises an expander for host adapter traffic, an expander for device adapter traffic, and a switch module connector for each of the plurality of blade slots. Each switch module connector is partitioned into a first interface for host adapter traffic and a second interface for device adapter traffic. The first interface is connected to the expander for host adapter traffic. The second interface is connected to the expander for device adapter traffic. The blade server system further comprises a blade in one or more of the plurality blade slots. The blade comprises a blade connector that is partitioned into a first interface for host adapter traffic and a second interface for device adapter traffic. The blade connector is coupled to one of the switch module connectors such that host adapter traffic occurs on the first interface and device adapter traffic occurs on the second interface. The blade is an integrated redundant array of independent disks drive enclosure blade. The first interface of the blade connector is a two lane interface. The second interface of the blade connector is a two lane interface.

In a further illustrative embodiment, a method is provided for configuring a blade server system. The method comprises providing a plurality of blade slots and providing at least one switch module. Each of the at least one switch module comprises a first expander for host adapter traffic, a second expander for device adapter traffic, and a switch module connector for each of the plurality of blade slots. Each switch module connector is partitioned into a first interface for host adapter traffic and a second interface for device adapter traffic. The first interface is connected to the first expander and the second interface is connected to the second expander. The method further comprises providing a blade comprising a blade connector. The blade connector is partitioned into a first interface for host adapter traffic and a second interface for device adapter traffic. The blade connector is configured to be coupled to one of the switch module connectors such that host adapter traffic occurs on the first interface and device adapter traffic occurs on the second interface. The blade is an integrated redundant array of independent disks drive enclosure blade. The method further comprises placing the integrated redundant array of independent disks drive enclosure blade in one or more of the plurality of blade slots such that the blade connector is coupled to one of the switch module connectors. Host adapter traffic occurs on the first interface and device adapter traffic occurs on the second interface. The first interface of the blade connector is a two lane interface. The second interface of the blade connector is a two lane interface.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
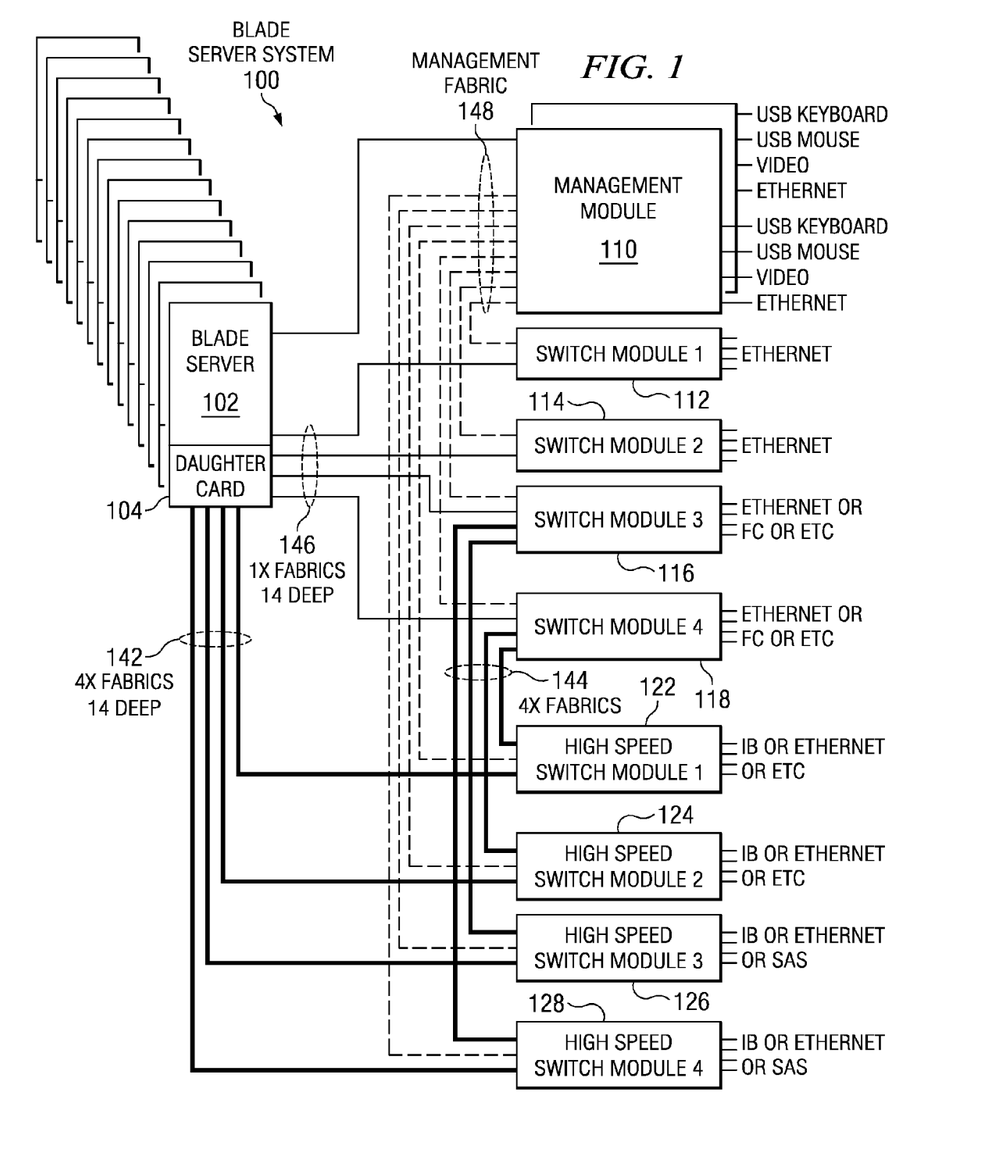
FIG. 1 depicts a pictorial representation of an exemplary blade server system in which aspects of the illustrative embodiments may be implemented.
Figure 2:
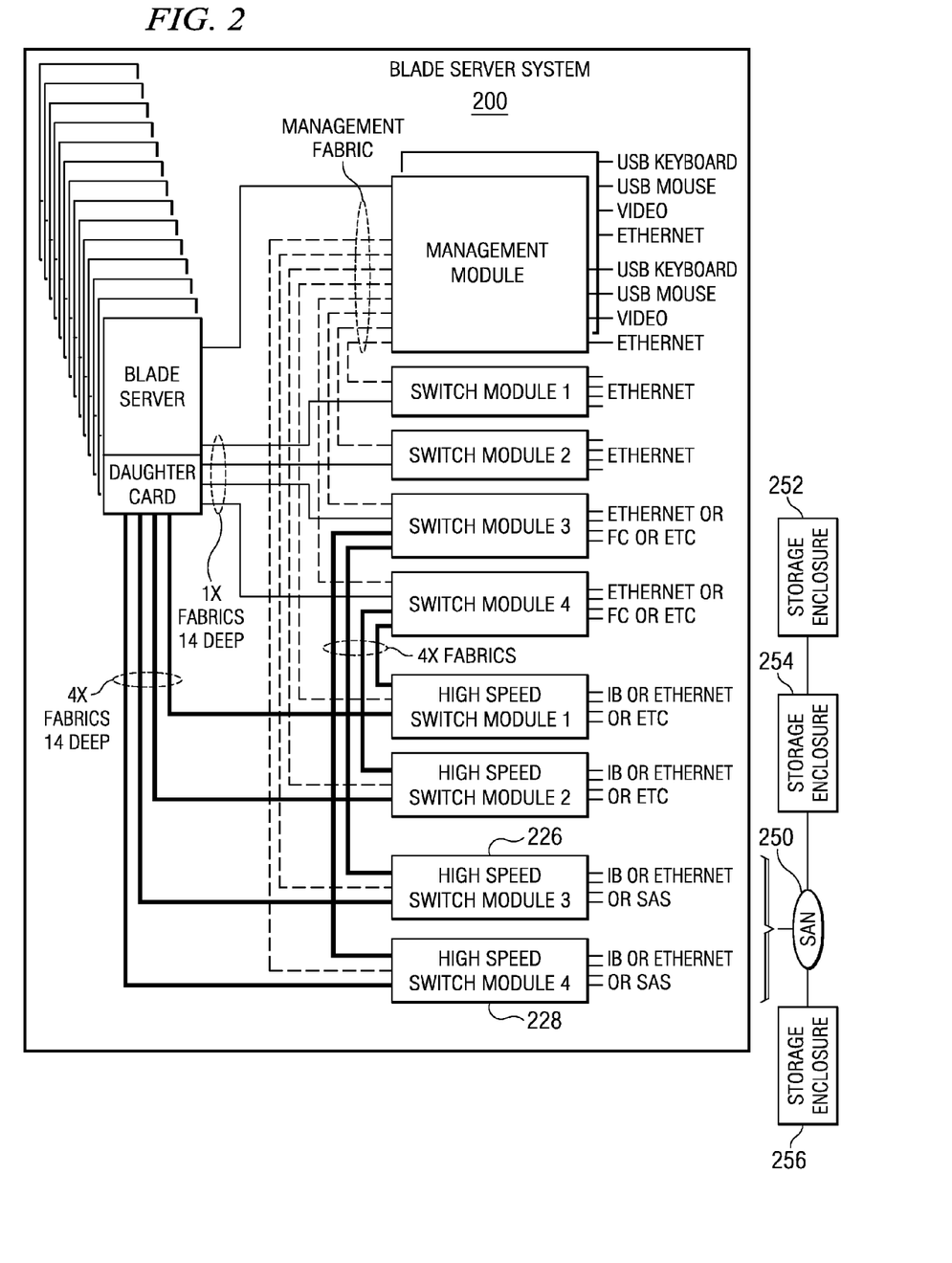
FIG. 2 illustrates a configuration and connectivity for attaching external storage via a storage area network in accordance with an illustrative embodiment.

With reference now to the figures and in particular with reference to FIGS. 1 and 2, exemplary diagrams of a data processing environment are provided in which illustrative embodiments of the present invention may be implemented. It should be appreciated that FIGS. 1 and 2 are only exemplary and is not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of an exemplary blade server system in which aspects of the illustrative embodiments may be implemented. Blade server system 100 may include a plurality of blade servers 102, each having a corresponding daughter card 104. In the depicted example, blade server system includes fourteen blade servers; however, more or fewer blade slots may be included depending upon the implementation. A server blade may be a processor blade, a storage blade, or the like.

Switch modules 1-4 112-118 provide connectivity to Ethernet, Fiber Channel, or the like. Blade servers 102 and daughter cards 104 connect to switch modules 112-118 through one lane (1X) fabrics 146 (14 deep for the 14 blade servers in this example).

High speed switch module 1 122 and high speed switch module 2 124 provide connectivity to InfiniBand (IB), Ethernet, or the like. High speed switch module 3 126 and high speed switch module 4 128 provide connectivity to IB, Ethernet, or serial attached small computer systems interface (serial attached SCSI or SAS).

Blade servers 102 and daughter cards 104 connect to high speed switch modules 122-128 via four lane (4X) fabrics 142. These 4X fabrics are 14 deep for the 14 blade servers in this example). Also, 4X fabrics 144 connect switch modules 116, 118 and high speed switch modules 122-128.

Blade server system 100 also includes management module 110. Management module 110 performs various management functions for blade server system 100, such as monitoring the system and its associated blade servers 102, daughter cards 104, switch modules 112-118, 122-128, and the like. The components of blade server system 100 are connected to management module 110 through management fabric 148.

Those of ordinary skill in the art will appreciate that the hardware in FIG. 1 may vary depending on the implementation. Other internal hardware or peripheral devices, such as fans, power supplies, and the like, may be used in addition to, or in place of, the hardware depicted in FIG. 1. Also, the processes of the illustrative embodiments may be applied to a data processing system other than the blade server system mentioned above, without departing from the spirit and scope of the illustrative embodiments.

FIG. 2 illustrates a configuration and connectivity for attaching external storage via a storage area network in accordance with an illustrative embodiment. Blade server system 200 may connect to storage area network (SAN) 250 through high speed switch modules 226, 228, for example. SAN 250 may connect to switch modules 226 and 228 through InfiniBand, Ethernet, or SAS; however, in the illustrative embodiment, switch modules 226 and 228 connect to SAN 250 through SAS connections. Storage enclosures 252, 254, 256 also connect to SAN 250 using SAS connections.

Figure 3:
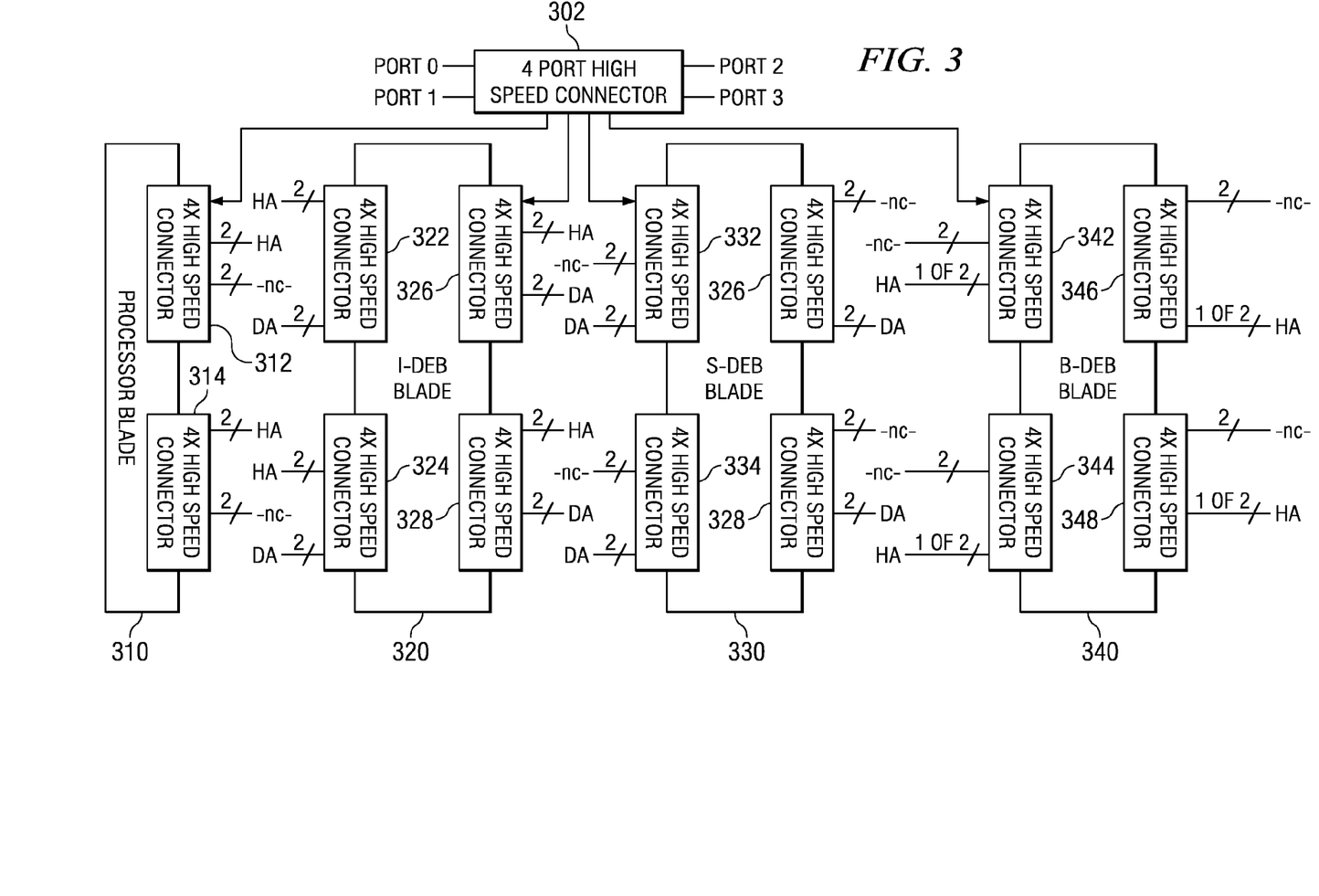
FIG. 3 illustrates a fabric connection of various blade implementations in accordance with an illustrative embodiment.

FIG. 3 illustrates a fabric connection of various blade implementations in accordance with an illustrative embodiment. Processor blade 310 provides one or more server processors. Processor blade 310 comprises two 4X high-speed connections 312, 314. The fabric connections 312, 314 of processor blade 310 are partitioned into dual two lane (2X) sub-fabrics to separate the host adapter (HA) traffic from the device adapter (DA) traffic. Host adapter traffic is the data that flows between the processor blade and the storage and/or RAID controller, via the high speed SAS switch. Device adapter traffic is the data that flows between the RAID controller and storage via the SAS switch. As seen in the depicted example, the DA interface is not connected (-nc-).

Figure 5:
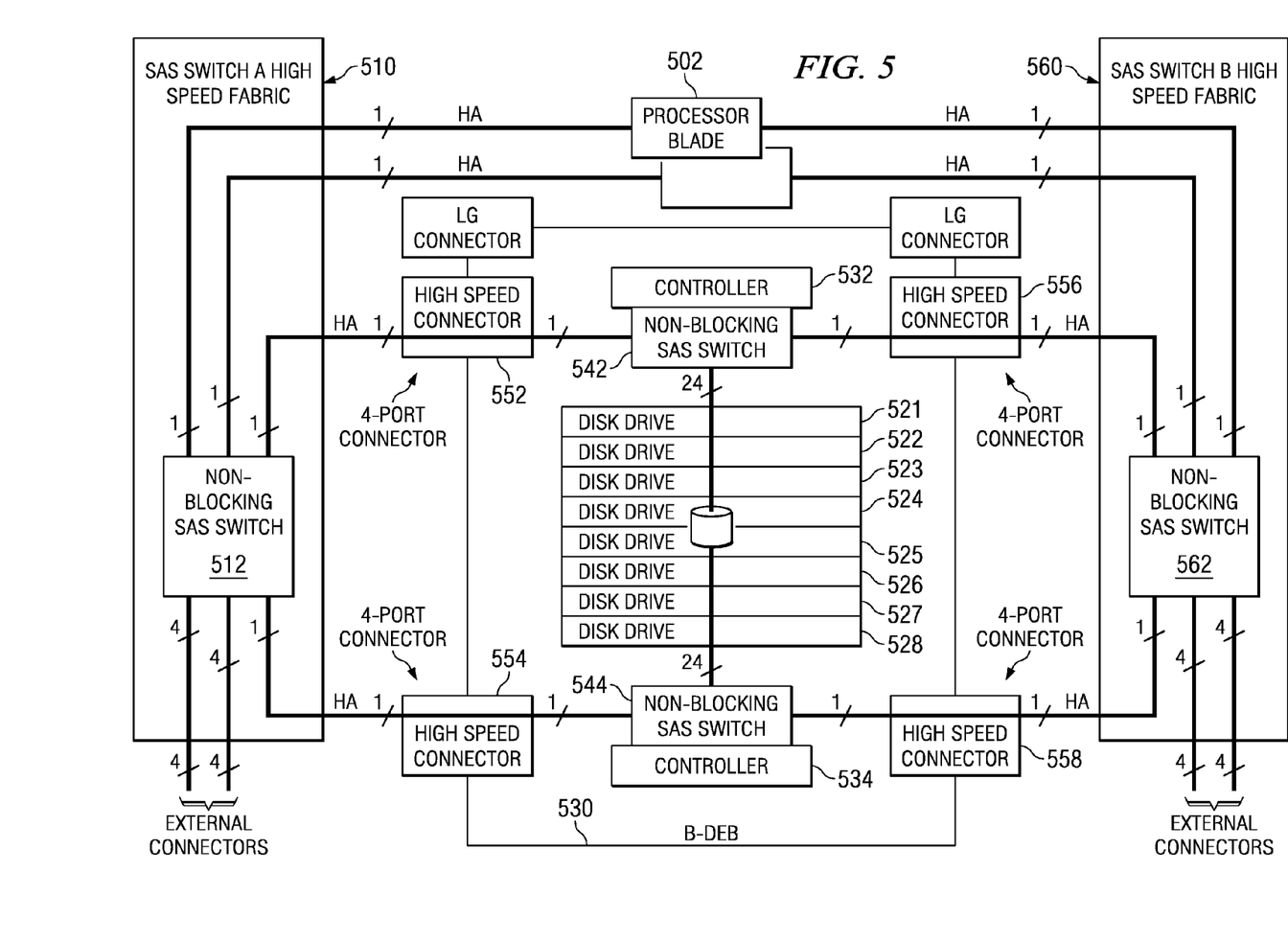
FIG. 5 illustrates a topology for interfacing processor blades and a boot disk enclosure blade (B-DEB) in accordance with an exemplary embodiment.
Figure 6:
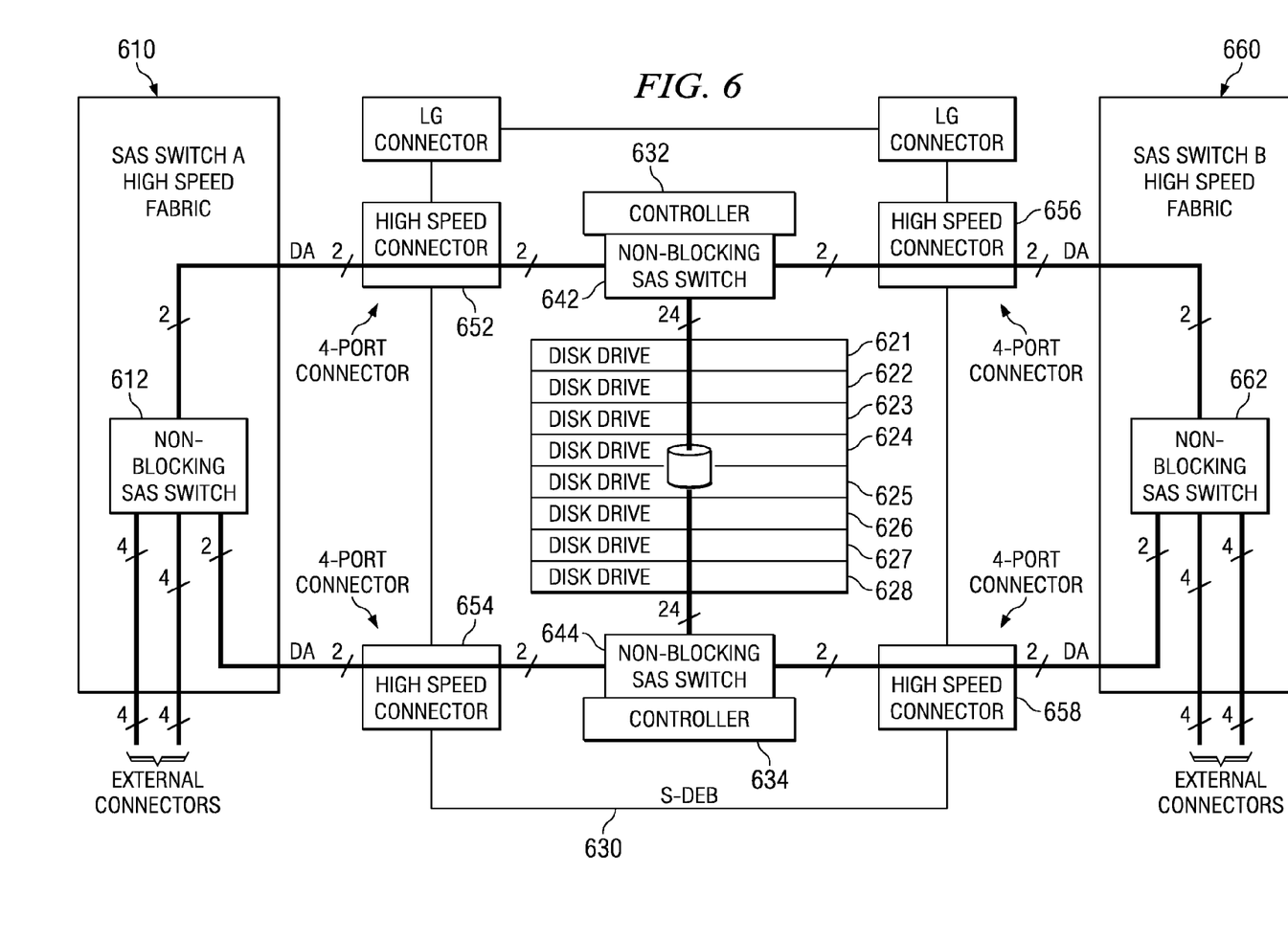
FIG. 6 illustrates a topology for interfacing processor blades and a switched bunch of disks enclosure blade (S-DEB) in accordance with an exemplary embodiment.
Figure 7:
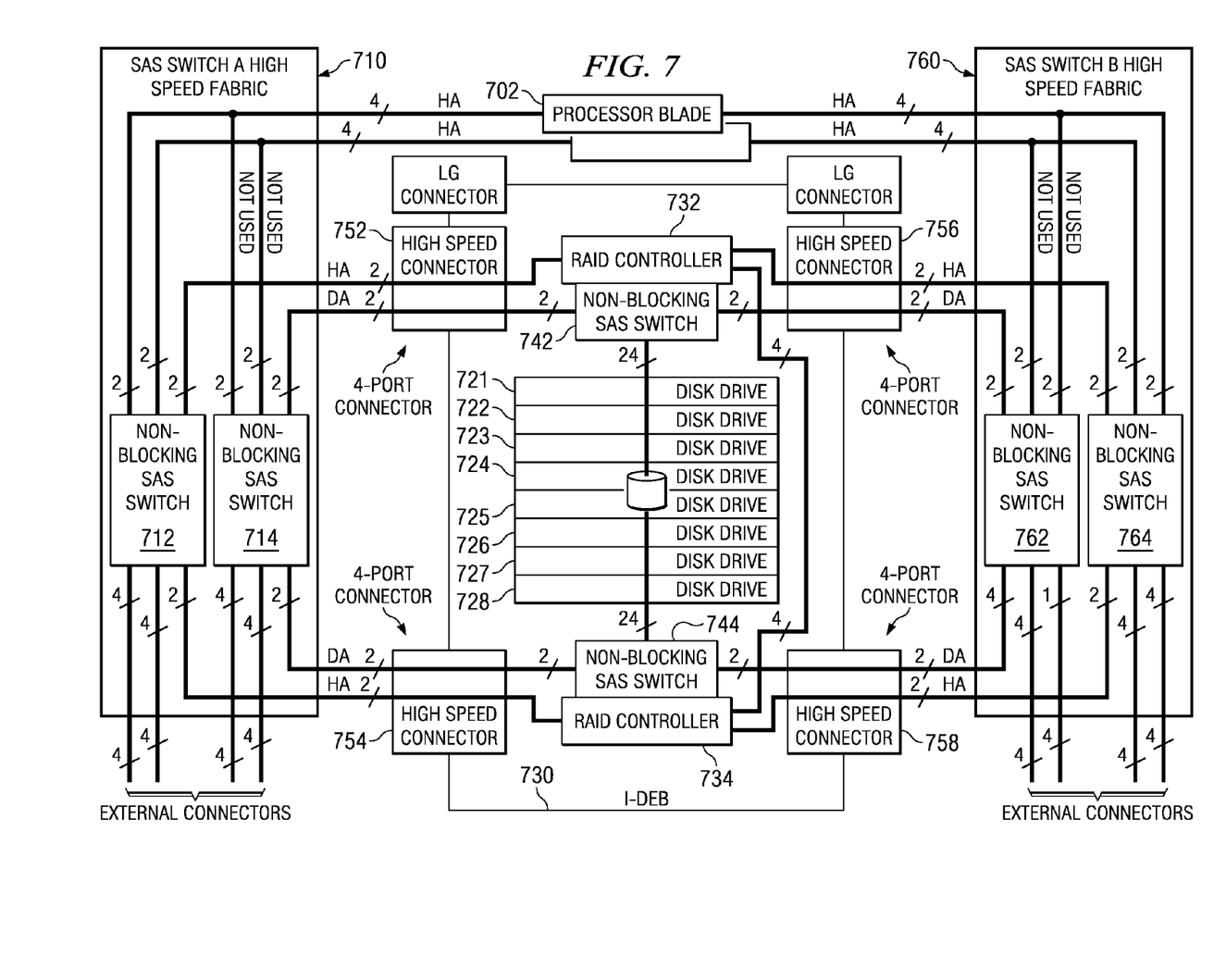
FIG. 7 illustrates a topology for interfacing processor blades and an integrated RAID controller disk enclosure blade (I-DEB) in accordance with an exemplary embodiment.

FIG. 3 also depicts three variants on storage blade implementations. FIGS. 5-7 illustrate these different blade implementations, as will be discussed in further detail below.

I-DEB blade 320 provides a "switched bunch of disks" (SBOD) with an integrated RAID controller. I-DEB blade 320 comprises four 4X high-speed connections 322, 324, 326, 328. On I-DEB blade 320, connectors 322, 324, 326, 328 are partitioned into dual 2X interfaces, one for HA traffic and one for DA traffic. I-DEB blade 320 has an integrated RAID controller in conjunction with multiple disk drives, as will be shown in FIG. 7 and described in further detail below.

S-DEB blade 330 provides a SBOD without an integrated RAID controller. S-DEB blade 330 has four 4X high-speed connectors 332, 334, 336, 338. On S-DEB blade 330, connectors 332, 334, 336, 338 use only a single 2X interface for DA traffic. S-DEB blade 330 is essentially a SBOD that provides simple shared storage for the processor blades.

B-DEB blade 340 provides boot drives for the processor blades in the blade server system. B-DEB blade 340 is a simple SBOD, but provides redundant disk drives for the processor blades boot function (non-customer data). B-DEB blade 340 comprises four 4X high-speed connectors 342, 344, 346, 348. On B-DEB blade 340, connectors 342, 344, 346, 348 use only a single 1X interface for HA traffic.

Figure 4:
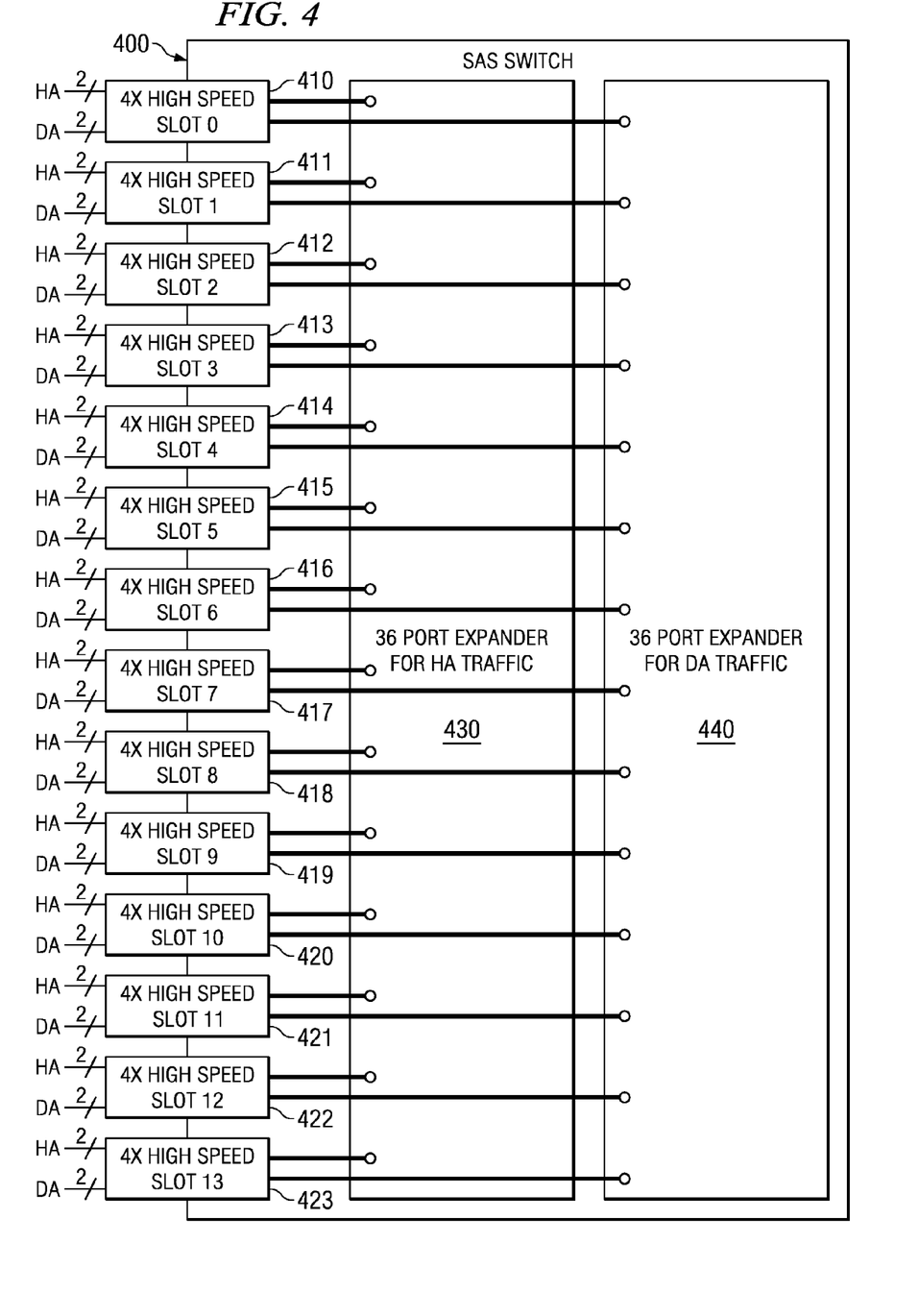
FIG. 4 illustrates a configuration for partitioning connectors in a high-speed switch module in accordance with an illustrative embodiment.

FIG. 4 illustrates a configuration for partitioning connectors in a high-speed switch module in accordance with an illustrative embodiment. Serial attached SCSI (SAS) switch 400 comprises 36-port expander 430 for host adapter (HA) traffic and 36-port expander 440 for device adapter (DA) traffic. SAS switch 400 supports connection to 14 blade slots through 4X high speed connectors 410-423. Each 4X connector 410-423 is partitioned into dual 2X interfaces.

Also, each 4X connector is associated with a blade slot 0-13. Blade slots may be populated with any combination of processor blades, B-DEB blades, S-DEB blades, or I-DEB blades. Dual SAS expanders 430, 440 are implemented in SAS switch 400 to accommodate the separate HA and DA traffic.

FIG. 5 illustrates a topology for interfacing processor blades and a boot disk enclosure blade (B-DEB) in accordance with an exemplary embodiment. Processor blades 502 connect to serial attached SCSI (SAS) switch A high-speed fabric 510 and SAS switch B high-speed fabric 560. Switch modules, such as switches 510, 560, may be used in pairs for redundancy. Processor blades 502 and SAS switches 510, 560 may be internal to a blade server system, such as blade server system 100 shown in FIG. 1. More particularly, processor blades 502 may be one of blade servers 102, and SAS switches 510, 560 may be high speed switch modules 126, 128, for example.

Boot disk enclosure blade (B-DEB) 530 may also be a blade itself, such as one of blade servers 102 in FIG. 1.

B-DEB 530 includes storage controllers 532 and 534. Storage controllers 532, 534 connect to disk drives 521-528 via internal non-blocking SAS switches 542, 544. Non-blocking SAS switches 542, 544 connect to SAS switch 510 via high-speed connectors 552, 554. Non-blocking SAS switches 542, 544 connect to SAS switch 560 via high-speed connectors 556, 558. High-speed connectors 552, 554, 556, 558 are 4-port connectors.

In B-DEB 530, high-speed connectors 552, 554 connect to non-blocking switch 512 in SAS switch A high-speed fabric 510 through 1X interfaces, as described above with respect to FIG. 3. Similarly, high-speed connectors 556, 558 connect to non-blocking switch 562 in SAS switch B high-speed fabric 560 through 1X interfaces. Host adapter (HA) traffic occurs through these 1X interfaces. Also, processor blades 502 connect to non-blocking SAS switch 512 and non-blocking SAS switch 562 through 1X interfaces. HA traffic occurs through these interfaces. Non-blocking SAS switches 512, 562 may also provide dual 4X connectors for external devices.

FIG. 6 illustrates a topology for interfacing processor blades and a switched bunch of disks enclosure blade (S-DEB) in accordance with an exemplary embodiment. Switch modules, such as switches 610, 660, may be used in pairs for redundancy. SAS switches 610, 660 may be internal to a blade server system, such as blade server system 100 shown in FIG. 1. More particularly, SAS switches 610, 660 may be high speed switch modules 126, 128, for example.

Switched bunch of disks (SBOD) enclosure blade (S-DEB) 630 may be a blade itself, such as one of blade servers 102 in FIG. 1. S-DEB 630 includes storage controllers 632 and 634. Storage controllers 632, 634 connect to disk drives 621-628 via internal non-blocking SAS switches 642, 644. Non-blocking SAS switches 642, 644 connect to SAS switch 610 via high-speed connectors 652, 654. Non-blocking SAS switches 642, 644 connect to SAS switch 660 via high-speed connectors 656, 658. High-speed connectors 652, 654, 656, 658 are 4-port connectors.

In S-DEB 630, high-speed connectors 652, 654 connect to non-blocking switch 612 in SAS switch A high-speed fabric 610 through 2X interfaces, as described above with respect to FIG. 3. Similarly, high-speed connectors 656, 658 connect to non-blocking switch 662 in SAS switch B high-speed fabric 660 through 2X interfaces. Device adapter (DA) traffic occurs through these 2X interfaces. Non-blocking SAS switches 612, 662 may also provide dual 4X connectors for external devices.

FIG. 7 illustrates a topology for interfacing processor blades and an integrated RAID controller disk enclosure blade (I-DEB) in accordance with an exemplary embodiment. Processor blades 702 connect to serial attached SCSI (SAS) switch A high-speed fabric 710 and SAS switch B high-speed fabric 760. Switch modules, such as switches 710, 760, may be used in pairs for redundancy. Processor blades 702 and SAS switches 710, 760 may be internal to a blade server system, such as blade server system 100 shown in FIG. 1. More particularly, processor blades 702 may be one of blade servers 102, and SAS switches 710, 760 may be high speed switch modules 126, 128, for example.

Integrated RAID controller disk enclosure blade (I-DEB) 730 may also be a blade itself, such as one of blade servers 102 in FIG. 1. I-DEB 730 includes redundant array of independent disk (RAID) controllers 732 and 734. RAID controllers 732, 734 connect to disk drives 721-728 via internal non-blocking SAS switches 742, 744. Non-blocking SAS switches 742, 744 connect to SAS switch 710 via high-speed connectors 752, 754. Non-blocking SAS switches 742, 744 connect to SAS switch 760 via high-speed connectors 756, 758. High-speed connectors 752, 754, 756, 758 are 4-port connectors.

In I-DEB 730, high-speed connectors 752, 754 connect to non-blocking switch 714 in SAS switch A high-speed fabric 710 through 2X interfaces, as described above with respect to FIG. 3. Similarly, high-speed connectors 756, 758 connect to non-blocking switch 762 in SAS switch B high-speed fabric 760 through 2X interfaces. Device adapter (DA) traffic occurs through these 2X interfaces.

RAID controllers 732, 734 connect to 2X interfaces of non-blocking SAS switch 712 in SAS switch A high-speed fabric 710 through HS connectors 752, 754. RAID controllers 732, 734 connect to 2X interfaces of non-blocking SAS switch 764 of SAS switch B high-speed fabric 760 through high-speed connectors 756, 758. Also, processor blades 702 connect to non-blocking SAS switch 712 and non-blocking SAS switch 764 through 2X interfaces. HA traffic occurs through these interfaces. Non-blocking SAS switches 712, 714, 762, 764 may also provide dual 4X connectors for external devices.

Figure 8:
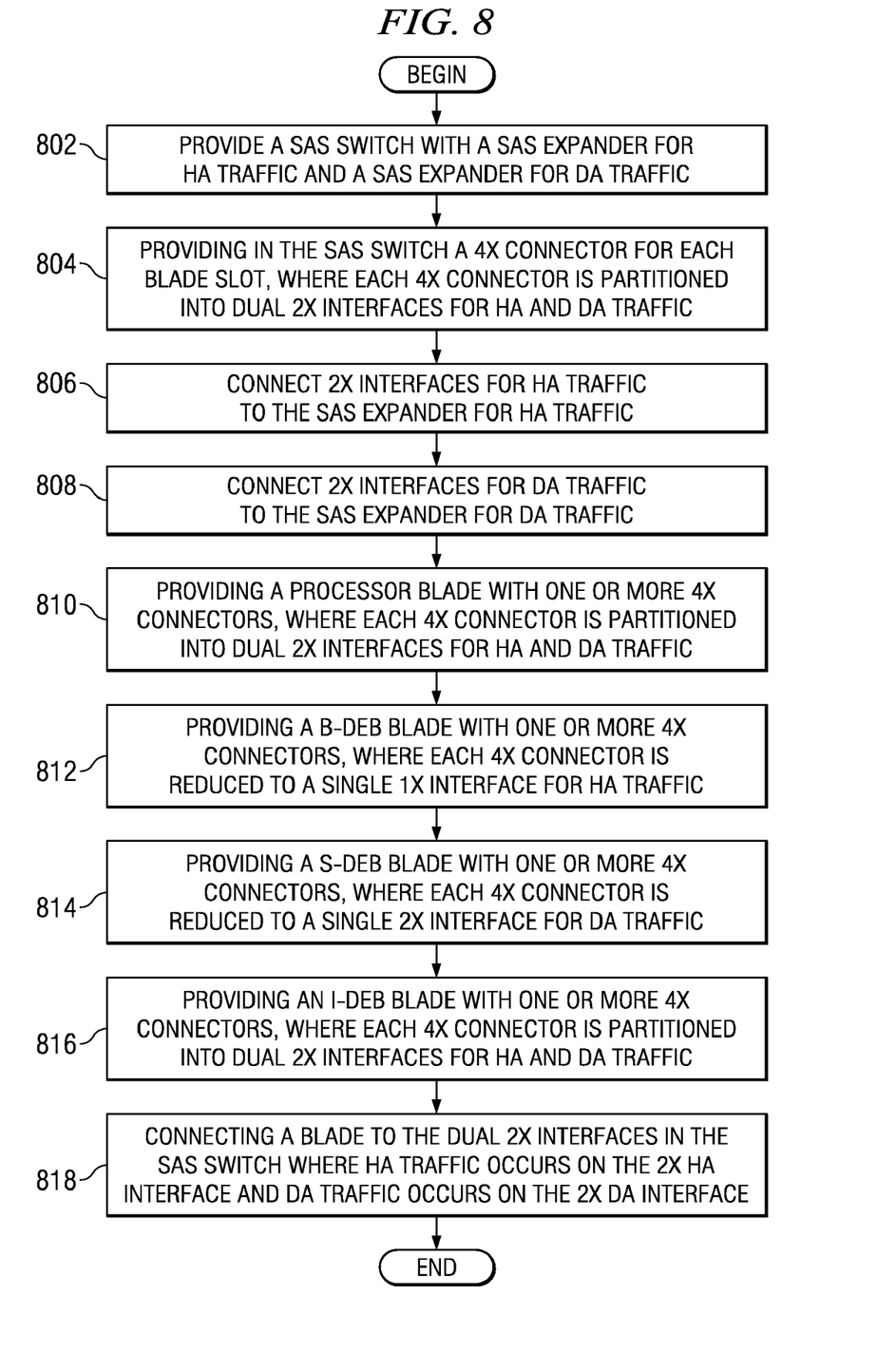
FIG. 8 is a flowchart illustrating operation of configuring various types of blades in a blade server system with high-speed switch fabrics in accordance with an illustrative embodiment.

FIG. 8 is a flowchart illustrating operation of configuring various types of blades in a blade server system with high-speed switch fabrics in accordance with an illustrative embodiment. Operation begins and provides a serial attached SCSI (SAS) switch with a SAS expander for host adapter (HA) traffic and a SAS expander for device adapter (DA) traffic (block 802). Then, one provides in the SAS switch a 4X connector for each blade slot, where each 4X connector is partitioned into dual 2X interfaces for HA traffic and DA traffic (block 804). Thereafter, one connects the 2X interfaces for HA traffic to the SAS expander for HA traffic (block 806) and connects the 2X interfaces for DA traffic to the SAS expander for DA traffic (block 808).

One provides a processor blade with one or more 4X connectors, where each 4X connector is partitioned into dual 2X interfaces for HA and DA traffic (block 810). One provides a B-DEB blade with one or more 4X connectors, where each 4X connector is reduced to a single 1X interface for HA traffic (block 812). One provides an S-DEB blade with one or more 4X connectors, where each 4X connector is reduced to a single 2X interface for DA traffic (block 814). And, one provides an I-DEB blade with one or more 4X connectors, where each 4X connector is partitioned into dual 2X interfaces for HA and DA traffic (block 816).

Then, one connects a blade to the dual 2X interfaces on the SAS switch where HA traffic occurs on the 2X HA interface and DA traffic occurs on the 2X DA interface (block 818). Thereafter, operation ends. One may connect any combination of processor blades, B-DEBs, S-DEBs, and/or I-DEBs in block 818. The configuration of the switches and the connectors, particularly the manner in which the connectors are partitioned to separate the HA and DA traffic, allows any blade to be connected to any slot. The configuration uses existing high-speed SAS fabric topology.

Thus, the illustrative embodiments solve the disadvantages of the prior art by providing a high speed fabric that partitions the fabric into sub-fabrics for host adapter traffic and device adapter traffic. A high-speed switch includes an expander for host adapter traffic and an expander for device adapter traffic. The high-speed switch also includes a plurality of connectors, where each connector is partitioned into dual interfaces. For each connector, one interface is connected to the host adapter traffic expander and the other interface is connected to the device adapter traffic expander. Blades are provided with one or more connectors, where each connector is partitioned into dual interfaces for host adapter traffic and device adapter traffic. The blades may be any combination of processor blades, boot drive enclosure blades, switched bunch of disks enclosure blades, and/or integrated RAID controller disk enclosure blades.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A blade server system, comprising:
    a plurality of blade slots;
    at least one switch module; and
    a blade in one or more of the plurality of blade slots,
    wherein each of the at least one switch module comprises:
        an expander for host adapter traffic;
        an expander for device adapter traffic; and
        a switch module connector for each of the plurality of blade slots,
        wherein each switch module connector is partitioned into a first interface for host adapter traffic and a second interface for device adapter traffic;
        wherein the first interface is connected to the expander for host adapter traffic; and
        wherein the second interface is connected to the expander for device adapter traffic;
    wherein the blade comprises a blade connector, wherein the blade connector is partitioned into a first interface for host adapter traffic of the blade and a second interface for device adapter traffic of the blade, and wherein the blade connector is coupled to one of the switch module connectors such that host adapter traffic occurs on the first interface and device adapter traffic occurs on the second interface; and
    wherein the blade is an integrated redundant array of independent disks drive enclosure blade, wherein the first interface of the blade connector is a two lane interface and wherein the second interface of the blade connector is a two lane interface.

2. The blade server system of claim 1, wherein the switch module is a serially attached small computer systems interface switch module.

3. The blade server system of claim 2, wherein the first expander is a serially attached small computer systems interface expander and wherein the second expander is a serially attached small computer systems interface expander.

4. The blade server system of claim 1, wherein each connector is a four lane connector.

5. The blade server system of claim 4, wherein the first interface is a two lane interface and wherein the second interface is a two lane interface.

6. A method for configuring a blade server system, the method comprising:
    providing a plurality of blade slots;
    providing at least one switch module, wherein each of the at least one switch module comprises a first expander for host adapter traffic, a second expander for device adapter traffic, and a switch module connector for each of the plurality of blade slots, wherein each switch module connector is partitioned into a first interface for host adapter traffic and a second interface for device adapter traffic, wherein the first interface is connected to the first expander, and wherein the second interface is connected to the second expander;
    providing a blade comprising a blade connector, wherein the blade connector is partitioned into a first interface for host adapter traffic and a second interface for device adapter traffic, wherein the blade connector is configured to be coupled to one of the switch module connectors such that host adapter traffic occurs on the first interface and device adapter traffic occurs on the second interface, and wherein the blade is an integrated redundant array of independent disks drive enclosure blade; and
    placing the integrated redundant array of independent disks drive enclosure blade in one or more of the plurality of blade slots such that the blade connector is coupled to one of the switch module connectors, wherein host adapter traffic occurs on the first interface and device adapter traffic occurs on the second interface, wherein the first interface of the blade connector is a two lane interface, and wherein the second interface of the blade connector is a two lane interface.

* * * * *